(12) United States Patent
Okawa et al.

(10) Patent No.: US 8,823,275 B2
(45) Date of Patent: Sep. 2, 2014

(54) LIGHTING CIRCUIT FOR LIGHT EMITTING ELEMENT AND ILLUMINATION APPARATUS INCLUDING SAME

(71) Applicant: Panasonic Corporation, Osaka (JP)

(72) Inventors: Masanao Okawa, Nara (JP); Hirofumi Konishi, Osaka (JP); Yohei Hayashi, Osaka (JP); Masanori Mishima, Kyoto (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 13/623,890

(22) Filed: Sep. 21, 2012

(65) Prior Publication Data

US 2013/0076246 A1    Mar. 28, 2013

(30) Foreign Application Priority Data

Sep. 22, 2011 (JP) ................. 2011-208000
Sep. 22, 2011 (JP) ................. 2011-208050

(51) Int. Cl.
*H05B 41/36* (2006.01)
*H05B 33/08* (2006.01)

(52) U.S. Cl.
CPC ................. *H05B 33/0896* (2013.01)
USPC ......... 315/223; 315/209 R; 315/291; 315/307

(58) Field of Classification Search
CPC ........... H05B 33/0815; H05B 41/2828; H05B 41/3927; H05B 33/0845; H05B 33/0839; H05B 37/02; Y02B 20/347
USPC ......... 315/224, 307, 186, 291, 297, 210, 287, 315/127, 246, 121, 185 R, 192, 209 R, 250, 315/294, 130, 152, 193, 312
See application file for complete search history.

(56) References Cited

U.S. PATENT DOCUMENTS 8,441,204 B2    5/2013  Otake et al.
8,698,409 B2 *  4/2014  Naruo et al. .............. 315/209 R
(Continued)

FOREIGN PATENT DOCUMENTS

CN    101971703    2/2011
JP    2011-60703    3/2011

OTHER PUBLICATIONS

Chinese Office Action for corresponding Chinese Application No. 201210358630.7 dated May 6, 2014 and English translation thereof.

*Primary Examiner* — Douglas W Owens
*Assistant Examiner* — Jianzi Chen
(74) *Attorney, Agent, or Firm* — Renner, Otto, Boisselle & Sklar, LLP

(57) ABSTRACT

A light-emitting-element lighting circuit for dimming a light emitting element having a diode characteristic by a PWM dimming signal is provided. The lighting circuit includes a dimming signal conversion unit configured to generate the PWM dimming signal having a duty ratio corresponding to an emission level specified by an input dimming signal. The lighting circuit further includes a minimum current generating circuit configured to flow a minimum current during an OFF period of the PWM dimming signal generated by the dimming signal conversion unit such that a voltage greater than a threshold voltage designed to allow the light emitting element to emit a light is applied to the light emitting element, and the light emitting element emits a light of a brightness equal to or less than a lowest emission level specified by the dimming signal.

20 Claims, 12 Drawing Sheets

(56) References Cited

U.S. PATENT DOCUMENTS

| | | |
|---|---|---|
| 2011/0057577 A1 | 3/2011 | Otake et al. |
| 2013/0038227 A1* | 2/2013 | Yan et al. ............ 315/186 |
| 2013/0193863 A1 | 8/2013 | Otake et al. |
| 2013/0193880 A1 | 8/2013 | Otake et al. |

* cited by examiner

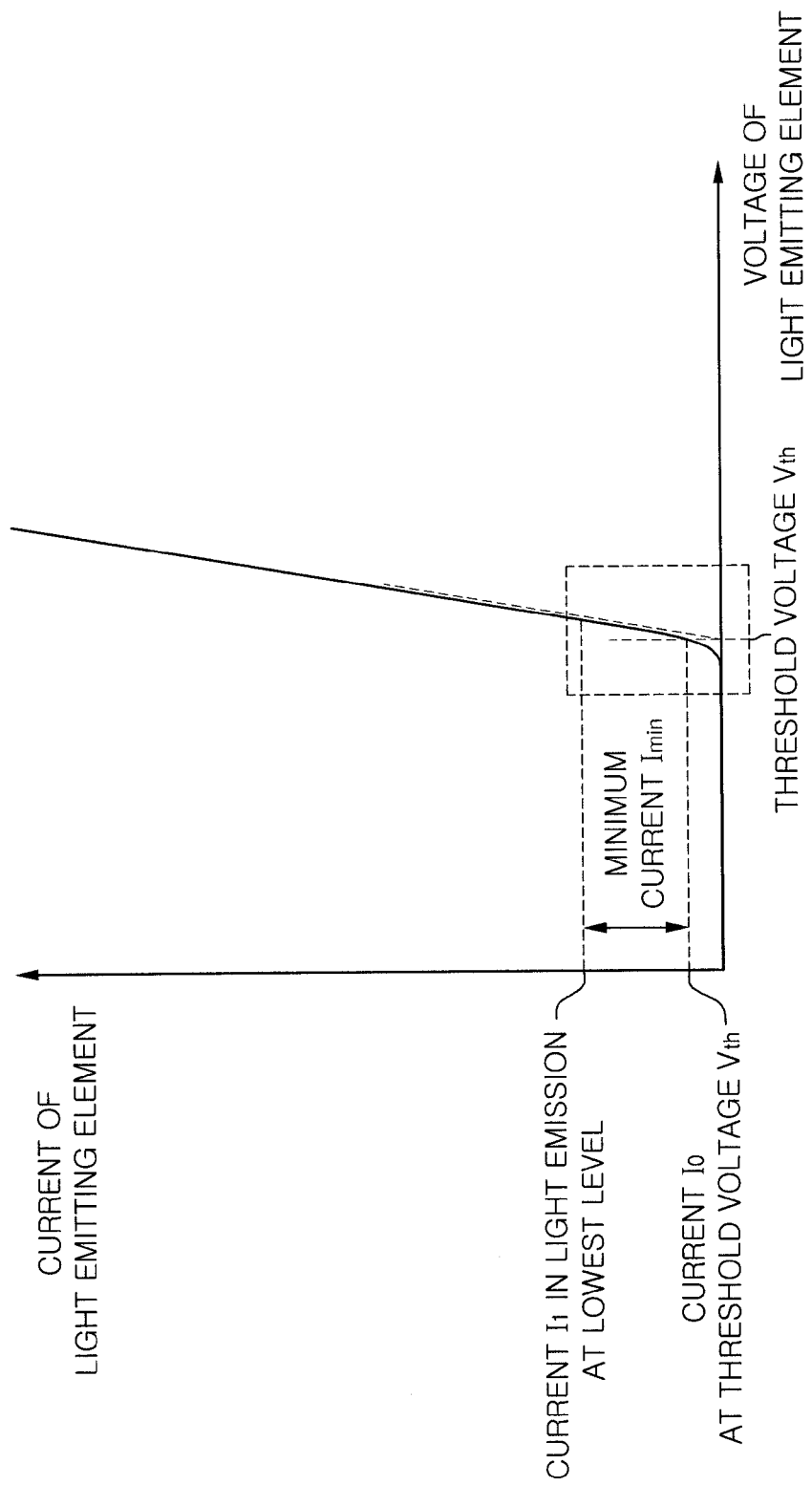

LIGHTING CIRCUIT FOR LIGHT EMITTING ELEMENT AND ILLUMINATION APPARATUS INCLUDING SAME

FIELD OF THE INVENTION

The present invention relates to a lighting circuit for a light emitting element such as an organic electroluminescence (EL) element and an illumination apparatus including the lighting circuit.

BACKGROUND OF THE INVENTION

Conventionally, there is known a lighting circuit configured to generate a PWM dimming signal corresponding to an emission level specified by a dimming signal, and perform the dimming control by using a light emitting element such as an organic EL element.

For example, Japanese Patent Application Publication No. 2011-60703 discloses a lighting circuit configured to perform a so-called burst dimming to stop the emission of the light emitting element during an OFF period of the PWM dimming signal.

The light emitting element such as an organic EL element having a diode characteristic begins to emit a light when an applied voltage exceeds a threshold voltage Vth. In the burst dimming performed by the apparatus described in Japanese Patent Application Publication No. 2011-60703, the emission of the light emitting element is completely stopped during the OFF period of the PWM dimming signal. Since there is a significant variation in the threshold voltage Vth of the light emitting element due to a manufacturing error, lighting timings of different light emitting elements may not the same when the PWM dimming signal is switched to a next ON period.

SUMMARY OF THE INVENTION

In view of the above, the present invention provides a lighting circuit for a light emitting element capable of greatly reducing variations in lighting timings when a PWM dimming signal is switched to a next ON period after an OFF period in burst dimming, and an illumination apparatus including the lighting circuit.

In accordance with an embodiment of the present invention, there is provided a light-emitting-element lighting circuit for dimming a light emitting element having a diode characteristic by a PWM dimming signal, the lighting circuit including: a dimming signal conversion unit configured to generate the PWM dimming signal having a duty ratio corresponding to an emission level specified by an input dimming signal; and a minimum current generating circuit configured to flow a minimum current during an OFF period of the PWM dimming signal generated by the dimming signal conversion unit such that a voltage greater than a threshold voltage designed to allow the light emitting element to emit a light is applied to the light emitting element, and the light emitting element emits a light of a brightness equal to or less than a lowest emission level specified by the dimming signal.

The lighting circuit described above may further include a dimming signal generating unit configured to generate a dimming signal and a signal for turn-off; and a minimum current stopping circuit configured to stop a flow of the minimum current.

The dimming signal conversion unit may generate, when the dimming signal has been inputted, the PWM dimming signal having a duty ratio greater than 0% depending on the emission level specified by the dimming signal, or may generate, when the signal for turn-off has been inputted, an off pulse signal having a duty ratio different from that of the PWM dimming signal generated in response to the dimming signal, and the dimming signal conversion unit may output the generated PWM dimming signal or the generated off pulse signal.

The minimum current stopping circuit may stop the flow of the minimum current by short-circuiting between an input and an output terminal of the light emitting element when the off pulse signal is inputted.

Further, the minimum current stopping circuit may include a turn-off signal generator configured to generate the signal for turn-off based on an input of the off pulse signal, and a transistor switch which is connected to the input and the output terminal of the light emitting element to configure a closed circuit. The transistor switch may be configured to short-circuit between the input and the output terminal of the light emitting element in response to an input of the signal for turn-off.

Further, the turn-off signal generator may detect the off pulse signal based on a length of the OFF period when the PWM dimming signal and the off pulse signal are inputted, and may include a timer configured to output a detection signal and a latch configured to operate in response to an input of the detection signal to output the signal for turn-off. The timer and the latch may have reset terminals to which the PWM dimming signal and the off pulse signal are inputted to perform a reset operation in response to an input of the PWM dimming signal.

The lighting circuit described above may further includes: a DC voltage generation circuit which has a driving unit to turn on and off a supply of power to the light emitting element and is connected to the light emitting element through the driving unit to output a DC voltage to the light emitting element while the driving unit is driven; and a PWM dimming signal processing unit configured to turn off the driving unit during the OFF period of the PWM dimming signal and output a driving signal to drive the driving unit during an ON period of the PWM dimming signal.

Further, the DC voltage generation circuit may include a chopper circuit and output the DC voltage to the light emitting element through the chopper circuit. The driving unit may be a switching transistor to chop a current in the chopper circuit by a chopper signal, and turns off the supply of power to the light emitting element when the chopper signal is not inputted, and the PWM dimming signal processing unit may output as the driving signal, the chopper signal to the switching transistor during the ON period of the PWM dimming signal.

Further, the minimum current generating circuit may be an impedance element, one end of which is connected to the output terminal of the light emitting element and the other end of which is grounded.

Further, the impedance element may be a resistor.
Further, the impedance element may be a diode.
Further, the impedance element may be a switching transistor in an OFF state.

Further, the minimum current generating circuit may include a diode which is a reverse-biased diode connected in parallel with the driving unit of the DC voltage generation circuit, and the diode may be turned on when the driving unit is turned off and have an impedance to flow the minimum current.

Further, the PWM dimming signal processing unit may include a detection circuit to detect the OFF period, and the minimum current generating circuit may convert the driving signal into a different driving signal having a duty ratio to flow the minimum current and output the different driving signal to the driving unit in response to the detection of the OFF period by the detection circuit.

Further, the PWM dimming signal processing unit may include a detection circuit to detect the OFF period, and the minimum current generating circuit may include a constant voltage circuit which starts an operation in response to the detection of the OFF period by the detection circuit, and the minimum current generating circuit may apply a voltage to the light emitting element such that the voltage applied to the light emitting element is greater than the threshold voltage and the light emitting element emits a light of the brightness equal to or less than the lowest emission level specified by the dimming signal.

Further, the light emitting element may be an organic electroluminescence (EL) light emitting element.

In accordance with another embodiment of the present invention, there is provided an illumination apparatus including: one or more illumination panels each having a light emitting element. The light emitting element is provided with the lighting circuit described above.

In accordance with the present invention, even during the OFF period of the PWM dimming signal in the burst dimming, the light emitting element having the threshold voltage as designed is maintained to slightly emit a light of a brightness equal to or less than the lowest dimming level specified by the dimming signal. Even if there are variations in threshold voltage due to manufacturing errors, by flowing the minimum current Imin in the light emitting element, in almost all cases, it is possible to eliminate the time period from the start of flowing the current in the light emitting element until the applied voltage exceeds the threshold voltage. As a result, in the burst dimming, it is possible to greatly reduce the variations in lighting timings when the PWM dimming signal is switched to a next ON period.

Further, when the signal for turn-off to specify the turn-off of the light emitting element is inputted, the minimum current stopping circuit stops the flow of the minimum current.

Further, in spite of employing the configuration of flowing the minimum current during the OFF period, when the light emitting element is turned off instead of the burst dimming, an unnecessary current does not flow in the circuit. For example, in a case where it is used in an illumination apparatus having multiple light emitting elements, it is possible to make the lighting timing of each light emitting element equal in the burst dimming, and achieve power saving during the turn-off period during which the burst dimming is not performed.

BRIEF DESCRIPTION OF THE DRAWINGS

The objects and features of the present invention will become apparent from the following description of embodiments, given in conjunction with the accompanying drawings, in which:

FIGS. 2A and 2B respectively show a graph showing voltage-current characteristics of a light emitting element having a diode characteristic, and a partially enlarged view of the graph;

DETAILED DESCRIPTION OF THE EMBODIMENTS

A lighting circuit for the light emitting element of an illumination apparatus in accordance with an embodiment of the present invention is a circuit performing a so-called burst dimming in which a light emitting element having a diode characteristic is turned on intermittently based on an ON period and an OFF period of a PWM dimming signal generated based on an emission level specified by a dimming signal. The PWM dimming signal is set to have a duty ratio greater than 0%. The lighting circuit for the light emitting element includes a minimum current generating circuit configured to allow a minimum current Imin to flow through the light emitting element such that a very weak light can be emitted from the light emitting element during the OFF period of the PWM dimming signal (hereinafter, referred to as "OFF period"). Further, the lighting circuit for the light emitting element includes a minimum current stopping circuit which generates a turn-off signal so as to stop the minimum current if the turn-off signal has been inputted instead of the dimming signal.

The minimum current Imin is a current to satisfy the conditions that, for the light emitting element, a voltage greater than a as-designed threshold voltage Vth at which the light emitting element begins to emit a light is applied and light emission is carried out at a brightness equal to or less than the lowest emission level. It is preferable that the minimum current Imin is set to a current value (hereinafter referred to as minimum current Imin1) to meet the above conditions and apply a voltage exceeding the threshold voltage Vth to all light emitting elements based on statistical data on variations in the actual threshold voltage Vth.

However, if it is difficult to set the minimum current Imin1 based on the distribution state of the statistical data, the minimum current Imin is set to a current value to meet the above conditions and apply a voltage exceeding the actual threshold voltage Vth to the light emitting elements of, e.g., 60% or more except those having a large variation that can be considered as a failure. 60% or more refers to 60% or more, more preferably 70% or more, more preferably 80% or more, more preferably 90% or more of the light emitting elements while it meets the above conditions. By emitting a light weakly even during the OFF period, in the burst dimming, it becomes possible to greatly reduce the variations in lighting timings at the next ON period of the PWM dimming signal (hereinafter simply referred to as the ON period). Further, by using the minimum current stopping circuit, it is possible to prevent the unnecessary current from flowing when it is turned off.

First Embodiment

Figure 1A:
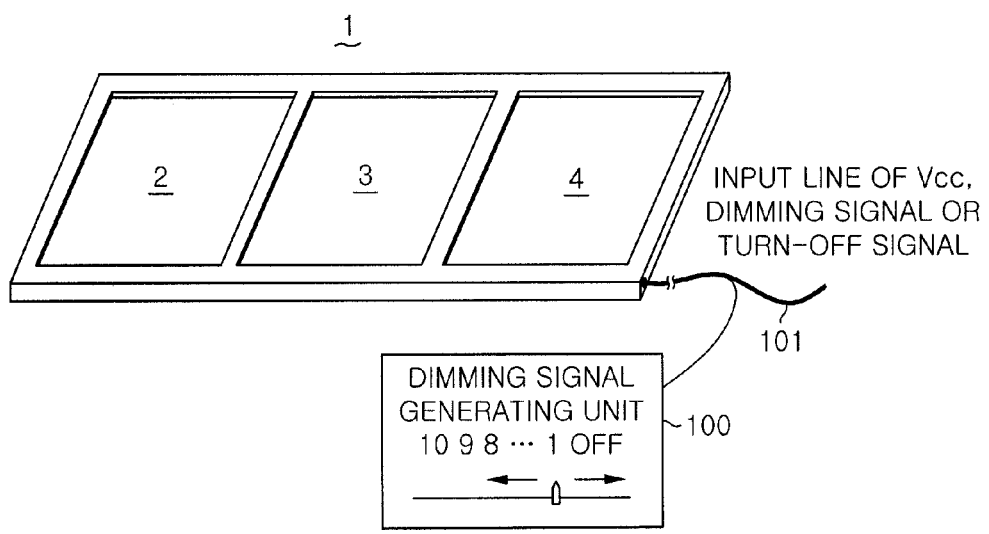
FIGS. 1A and 1B respectively show a perspective view and a cross-sectional view of an illumination apparatus having a lighting circuit for a light emitting element in accordance with a first embodiment of the present invention.
Figure 1B:
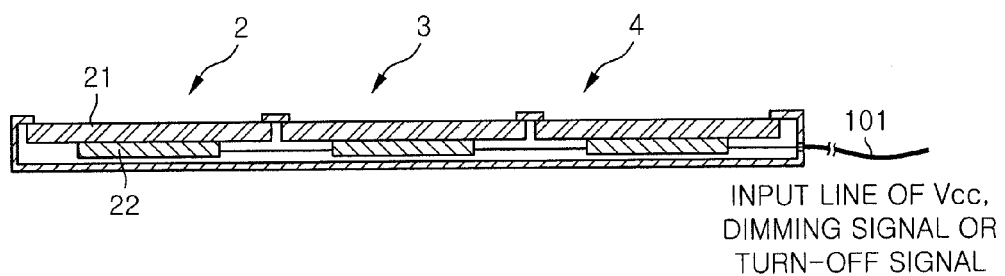

FIGS. 1A and 1B illustrate an illumination apparatus 1 in accordance with a first embodiment of the present invention. FIG. 1A is a perspective view of the illumination apparatus 1 fixed to a ceiling, a wall, a floor, a stand, or the like. The illumination apparatus 1 has three light emitting panels 2, 3 and 4, each having a light emitting surface facing upward in FIG. 1A. FIG. 1B is a cross-sectional view of the illumination apparatus 1. The light emitting panels 2, 3 and 4 have the same configuration.

Hereinafter, a light emitting panel 2 will be described as an example. The light emitting panel 2 includes an organic EL light emitting element 21 and a light-emitting-element lighting circuit (hereinafter simply referred to as lighting circuit) 22 performing a burst dimming of the light emitting element. The organic EL light emitting element 21 is a light emitting element having a diode characteristic and begins to emit a light at a level equal to or greater than a threshold voltage Vth. The lighting circuit 22 is connected to a commercial AC power source (not shown) of 50 Hz or 60 Hz, and a cable 101 to which a dimming signal or a turn-off signal is inputted from a dimming signal generating unit 100. The dimming signal is a gradation signal that stepwisely specifies the emission level from the highest emission level (level 10) to the lowest emission level (level 1). The turn-off signal is a signal that specifies the turn-off of the light emitting element. For example, the turn-off signal is a gradation signal of a value less than the signal that specifies the lowest emission level.

The lighting circuit 22 generates a PWM modulation signal of a duty ratio corresponding to the emission level specified by the dimming signal, and performs the burst dimming of the light emitting element based on the ON period and the OFF period of the PWM modulation signal. Further, the lighting circuit 22 allows the light emitting element 21 to slightly emit a light by flowing the minimum current Imin during the OFF period, thereby greatly reducing the variations in lighting timings due to a manufacturing error of the light emitting element 21. Therefore, the illumination apparatus 1 having a plurality of light emitting elements can make the lighting timing equal at a time when each light emitting element is switched from an OFF period to an ON period in the burst dimming.

Figure 2B:
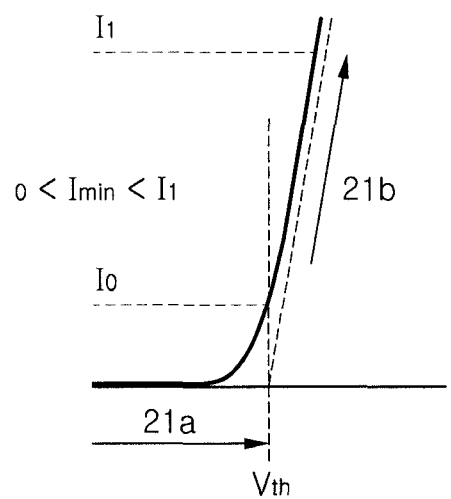

FIG. 2A is a graph showing a current I flowing through the light emitting element 21 when a voltage V is applied to the organic EL light emitting element 21 having a diode characteristic. FIG. 2B is an enlarged view of a portion where the applied voltage is closely approximated to the threshold voltage Vth, which is indicated by a dotted line in FIG. 2A. As shown in FIG. 2B, the light emitting element 21 does not emit a light and an actual current does not flow until the applied voltage reaches the threshold voltage Vth as indicated by an arrow 21a. The light emitting element 21 begins to emit a light when the applied voltage reaches the threshold voltage Vth, and then as indicated by arrow 21b, the emission level is increased in proportion to an increase in the applied voltage.

The minimum current Imin is larger than a current I0 at which the applied voltage has reaches the threshold voltage Vth and smaller than a current I1 at which the light is emitted at the lowest emission level. It is preferable that the minimum current Imin is set to a value (e.g., 1 mA or less) such that a ratio of the minimum current Imin to a rated current (e.g., 100 mA) is equal to or less than 1% within a range satisfying the above conditions.

Figure 3:
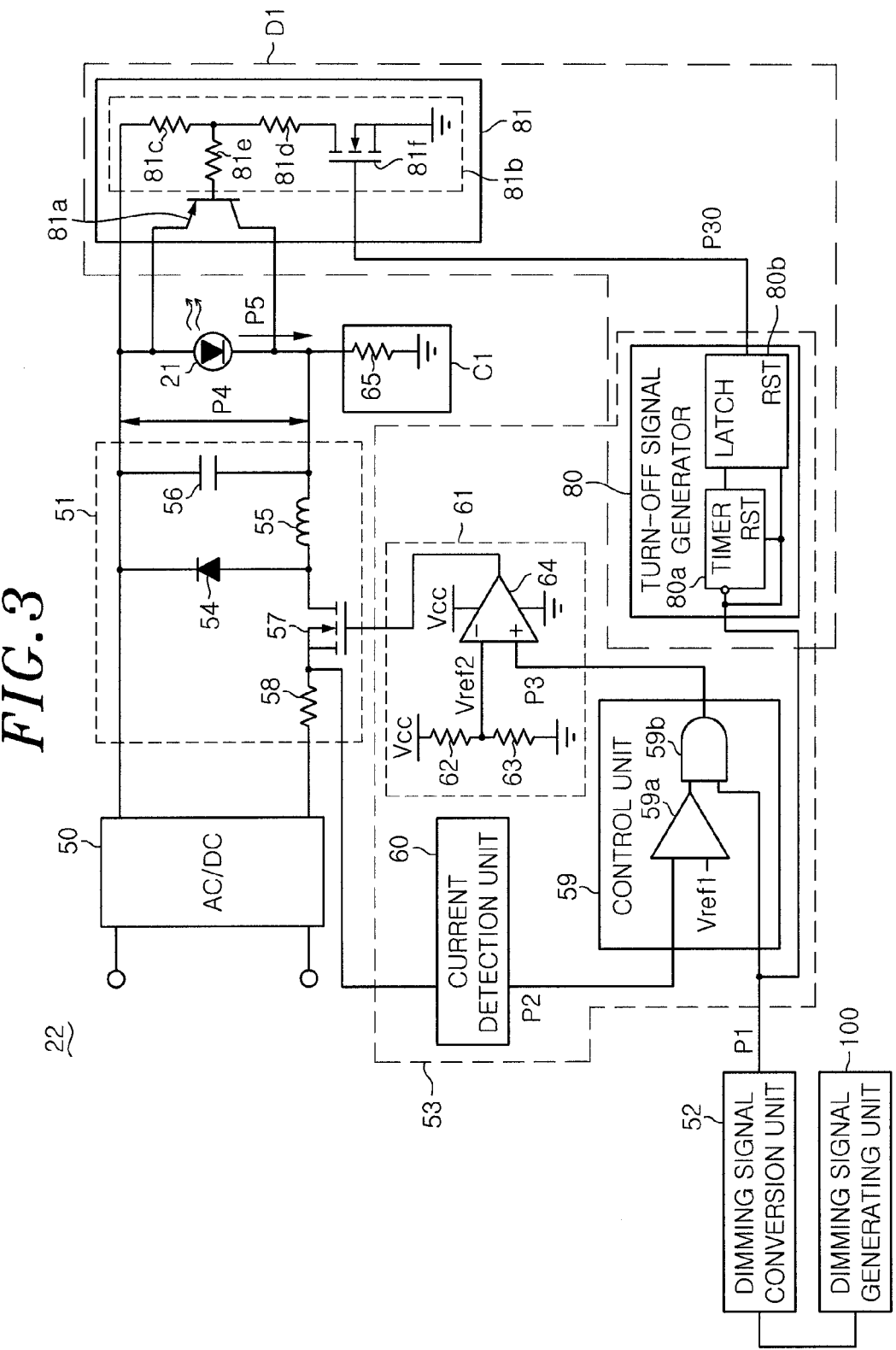
FIG. 3 is a circuit diagram of the lighting circuit for the light emitting element of the first embodiment.

FIG. 3 is a circuit diagram of the lighting circuit 22 connected to the organic EL light emitting element 21. The lighting circuit 22 includes an AC/DC unit 50 connected to a commercial AC power source, a power conversion unit 51, a dimming signal conversion unit 52 connected to the dimming signal generating unit 100, a PWM dimming signal processing unit 53, a minimum current generating circuit C1, and a minimum current stopping circuit D1.

The AC/DC unit 50 converts an inputted commercial AC voltage to a DC voltage and outputs the converted DC voltage. The power conversion unit 51 is a well-known step-down chopper circuit which steps down an output voltage level from the AC/DC unit 50 and outputs the stepped down output voltage. The power conversion unit 51 includes a diode 54, an inductor 55 that is a choke coil, a capacitor 56 for accumulating electric charges, a switching transistor 57 for driving the chopper circuit by current chopping in the circuit, and a resistor 58.

The AC/DC unit 50 and the power conversion unit 51 function as a DC voltage generation circuit which outputs a DC voltage to the light emitting element 21 while the switching transistor 57 is turned on and off by a chopper signal. Further, in this DC voltage generation circuit, the switching transistor 57 functions as a driving unit which outputs a DC voltage to the light emitting element 21 while it is turned on and off by the chopper signal that is a driving signal. For example, as a modification example, in addition to the switching transistor 57, a driving unit (switching circuit) which turns on/off the supply of power to the light emitting element 21 depending on the ON period and the OFF period may be interposed before or after the light emitting element 21.

The dimming signal conversion unit 52 generates and outputs a PWM dimming signal having a duty ratio corresponding to the emission level that is specified by the dimming signal inputted from the dimming signal generating unit 100. Further, the dimming signal conversion unit 52 outputs an off pulse signal having a duty ratio different from that of the PWM dimming signal generated in response to the dimming signal if a turn-off signal has been inputted from the dimming signal generating unit 100 instead of the dimming signal. In the first embodiment, the off pulse signal is a pulse signal having a duty ratio of 0%, i.e., wherein one cycle of the PWM dimming signal is set to an OFF period.

The PWM dimming signal processing unit 53 turns off the switching transistor 57 during the OFF period to turn off the supply of power to the light emitting element 21. Further, the PWM dimming signal processing unit 53 outputs a chopper signal (driving signal) for driving the switching transistor 57 during the ON period. The PWM dimming signal processing unit 53 includes a control unit 59, a current detection unit 60, and a driving signal generating unit 61. The control unit 59 includes a comparator 59a connected to the current detection unit 60, and an AND gate 59b connected to an output terminal of the comparator 59a and the dimming signal conversion unit 52.

The control unit 59 outputs a value obtained by quantizing a current value detected by the current detection unit 60 based on a reference value Vref1 during the ON period. The current detection unit 60 detects a voltage of the resistor 58 (current detecting resistor) on the downstream side of the switching transistor 57, and outputs a signal amplified by an error amplifier or the like. The driving signal generating unit 61 includes a voltage divider including two resistors 62 and 63 connected in series, and a comparator 64. The voltage divider divides a power source voltage Vcc to output a reference value Vref2. The comparator 64 compares a digital signal from the control unit 59 with the reference value Vref2, and outputs a chopper signal to drive the switching transistor 57. The chopper signal has a constant amplitude and a constant pulse width, and is outputted at regular intervals during the ON period.

The minimum current generating circuit C1 generates the minimum current Imin which flows in the OFF period to apply a voltage exceeding the threshold voltage Vth to the light emitting element 21 such that the light emitting element 21 emits a light of the brightness equal to or less than the lowest emission level specified by the dimming signal. The minimum current generating circuit C1 includes an impedance element 65, having a high impedance, one end of which is connected to an output terminal of the light emitting element 21 and the other end of which is grounded.

By connecting the minimum current generating circuit C1, the minimum current Imin slightly flows in the light emitting element 21 through the impedance element 65 even during the OFF period, i.e., the period in which the chopper signal is not outputted to the switching transistor 57. The impedance of the impedance element 65 is high enough to flow the minimum current Imin in the light emitting element 21. As an example of the impedance element 65, a resistor, a reverse-biased diode, or a parasitic diode of the switching transistor in the OFF state is used. As described above, the minimum current generating circuit C1 has a simple structure and, thus, it is possible to reduce the manufacturing cost of the lighting circuit 22.

The minimum current stopping circuit D1 detects that the turn-off is specified in the dimming signal generating unit 100, and stops flowing the minimum current Imin in the light emitting element 21. The minimum current stopping circuit D1 includes a turn-off signal generator 80 and a stop circuit 81.

The turn-off signal generator 80 detects an off pulse signal based on the length of an OFF period of the inputted PWM dimming signal and off pulse signal, and outputs a turn-off signal. The turn-off signal generator 80 includes a timer 80*a* to which receives inverted signals of the off pulse signal and the PWM dimming signal to count a low-level signal input period, and an RS latch 80*b* which is connected to an output terminal of the timer 80*a* and operates when a high-level signal is inputted. When the low-level signal indicating the OFF period has been inputted during a fixed period of one cycle of the PWM dimming signal or more (e.g., 1.5 cycle, 2 cycles or more), the timer 80*a* detects the off pulse signal and outputs the high-level signal. The PWM dimming signal and the off pulse signal are inputted to reset terminals of the timer 80*a* and the RS latch 80*b* to perform a reset operation in response to the high-level signal input which indicates the ON period of the PWM dimming signal.

The turn-off signal generator 80 configured as described above outputs the turn-off signal of high level after the turn-off is specified by the dimming signal until it is switched to the next ON period. Further, the turn-off signal generator 80 may realize the processing contents of the timer 80*a* and the RS latch 80*b* through software application.

The stop circuit 81 stops the current including the minimum current Imin from flowing in the light emitting element 21 in response to the high level input of the turn-off signal. The stop circuit 81 includes a PNP type switching transistor 81*a* which is connected in parallel to the light emitting element 21, and a switch circuit 81*b* which switches a gate potential of the transistor between an OFF state and an ON state. The switch circuit 81*b* includes resistors 81*c* and 81*d* connected in series, a resistor 81*e* connected between the gate and the midpoint of the series circuit of the resistors 81*c* and 81*d*, and an N channel type MOS transistor 81*f* provided between a ground terminal and the resistor 81*d*.

In the above configuration, if the turn-off signal is not inputted to the transistor 81*f*, the transistor 81*f* is turned off and, consequently, the potential of the midpoint has a value to maintain the transistor 81*a* in the OFF state. In this case, the stop circuit 81 is in an operation stop state to enable the current including the minimum current Imin to flow in the light emitting element 21. On the other hand, when the turn-off signal is inputted to the transistor 81*f*, the transistor 81*f* is turned on and, consequently, the potential of the midpoint decreases, and the transistor 81*a* is switched to the ON state. In this case, the stop circuit 81 is in an operation state, and stops the current including the minimum current Imin from flowing in the light emitting element 21 by short-circuiting between an input and an output terminal of the light emitting element.

Figure 4A:
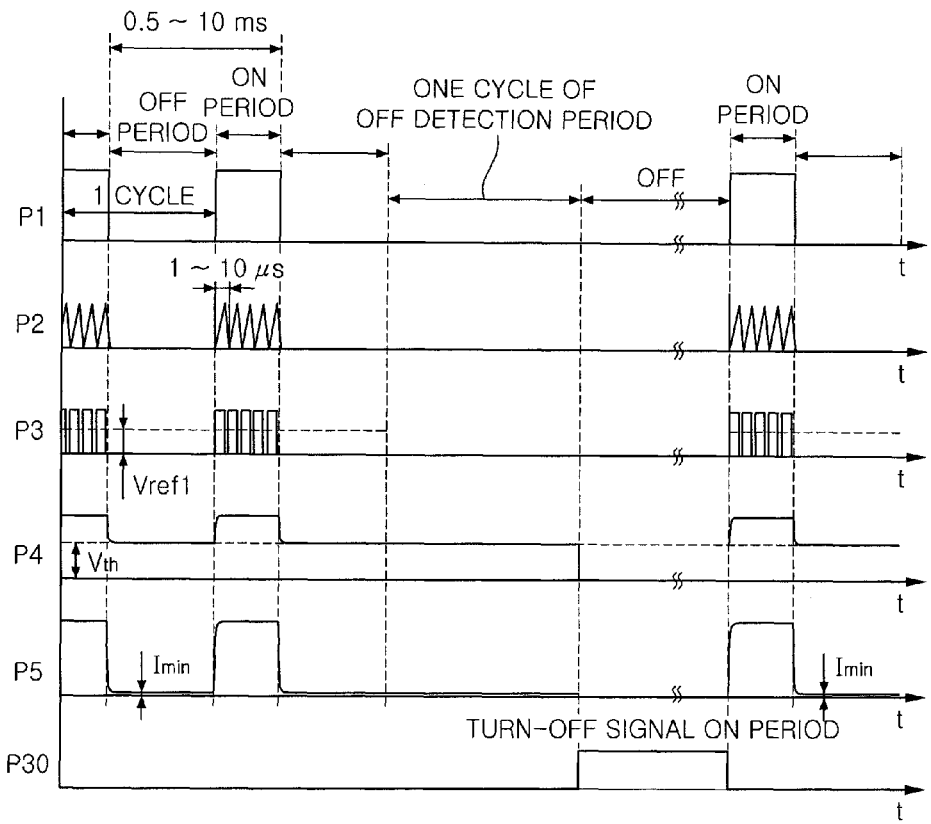
FIG. 4A is a time chart showing signals in the lighting circuit for the light emitting element of the first embodiment.
Figure 4B:
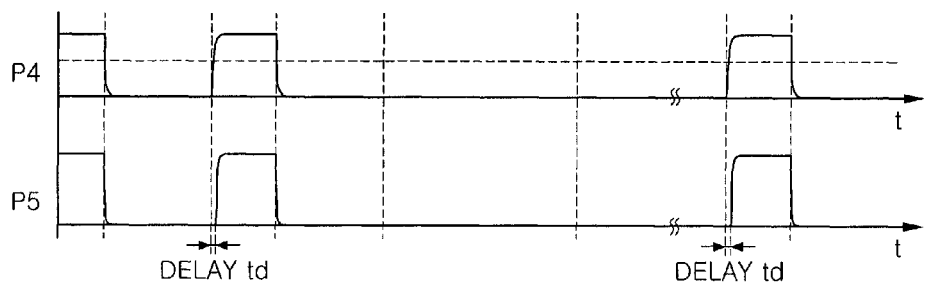
FIG. 4B is a comparative example showing waveforms of signals flowing through points P4 and P5 when no minimum current generating circuit is provided.

FIG. 4A shows waveforms of signals flowing through points P1 to P5 and P30 in the circuit shown in FIG. 3, and FIG. 4B is a comparative example showing waveforms of signals flowing through points P4 and P5 when the minimum current generating circuit C1 is not provided.

A signal at point P1 indicates the PWM modulation signal outputted from the dimming signal conversion unit 52. The cycle of the PWM dimming signal is set to be, e.g., more than or equal to 100 times the cycle of the chopper signal such that at least one chopper signal can be outputted during the ON period that is 1% of the duty ratio of the PWM dimming signal. For example, one cycle of the PWM modulation signal is set to be in a range from 0.5 to 10 ms (frequency f is in a range from 0.1 kHz to 2 kHz). A signal at point P2 is outputted from the current detection unit 60. For example, one cycle of the signal is set to be in a range from 1 to 10 μs (frequency f is in a range from 100 kHz to 1 MHz). A signal at point P3 is a digital signal outputted from the control unit 59, which is obtained by quantizing the signal of point P2 based on the reference value Vref1 during the ON period. Point P4 indicates a value of a voltage applied to the light emitting element 21 and point P5 indicates a current value flowing in the light emitting element 21. Point P30 indicates an output signal from the turn-off signal generator 80.

As shown in FIG. 4A, during the OFF period in the burst dimming, the minimum current Imin flows in the light emitting element 21, so that a voltage slightly greater than the threshold voltage Vth is applied to the light emitting element 21. In other words, it indicates that the light emitting element 21 slightly emits a light during this OFF period. Then, when it is switched to a next ON period, the current flowing in the light emitting element 21 is increased in proportion to the increase in the applied voltage without any delay.

It is known that the threshold voltage Vth increases or decreases slightly by a manufacturing error in the light emitting element 21. However, in this embodiment, the minimum current generating circuit C1 is provided to flow the minimum current Imin in the light emitting element 21, so that a rapid lighting of the light emitting element 21 can be achieved without any delay regardless of the manufacturing error.

In comparison, the waveforms shown in FIG. 4B shows that, if there is no minimum current generating circuit C1, no current flows in the light emitting element 21 during the OFF period. Then, when it is switched to a next ON period, the current flowing in the light emitting element 21 is increased after the applied voltage is increased to the threshold voltage Vth, i.e., after a time delay td.

Further, as shown in FIG. 4A, if the OFF period is continued for one cycle of the PWM dimming signal, the turn-off signal generator 80 outputs a turn-off signal of high level until the dimming signal is inputted. While the turn-off signal of high level is outputted, the minimum current stopping circuit D1 stops the current including the minimum current Imin from flowing in the light emitting element 21. Further, when the PWM dimming signal is switched to an ON period in order to resume the burst dimming, the minimum current stopping circuit D1 stops its operation, and the current immediately flows in the light emitting element 21 compared to a case where the supply of power has been completely turned off.

As described above, by using the lighting circuit 22, the light emitting element having the as-designed threshold voltage is maintained to slightly emit a light of the brightness equal to or less than the lowest dimming level specified by the dimming signal even during the OFF period of the PWM dimming signal in the burst dimming.

Therefore, even if there is a variation in threshold voltage due to a manufacturing error, by flowing the minimum current Imin, in almost all or all cases, it is possible to eliminate the delay time period from the start of flowing the current in the light emitting element until the applied voltage exceeds the threshold voltage.

As a result, in the burst dimming, it is possible to completely eliminate or greatly reduce the variations in lighting timings when the PWM dimming signal is switched to a next ON period. Further, when the turn-off signal to specify the turn-off of the light emitting element is inputted, the minimum current stopping circuit stops the flow of the minimum current Imin. Further, in spite of employing the configuration of flowing the minimum current during the OFF period, when the light emitting element is turned off instead of the burst dimming, an unnecessary current does not flow in the circuit. For example, in a case where it is used in an illumination apparatus having multiple light emitting elements, it is possible to make the lighting timing of each light emitting element in the burst dimming equal, and achieve power saving during the turn-off period during which the burst dimming is not performed.

Modification of First Embodiment

Figure 5:
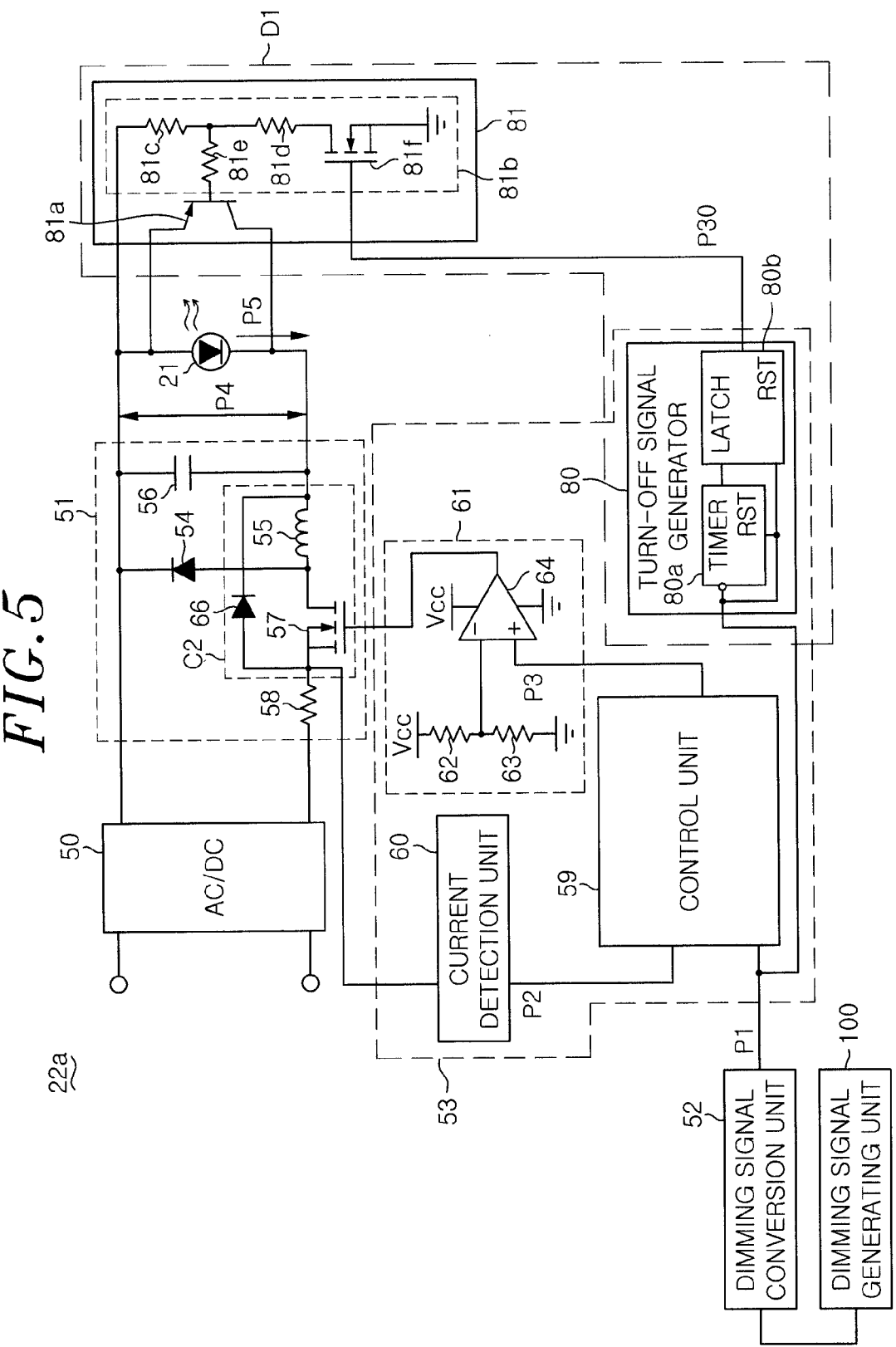
FIG. 5 shows a circuit diagram of a lighting circuit for the light emitting element that is a modification of the first embodiment.

FIG. 5 shows a circuit diagram of a light-emitting-element lighting circuit 22a that is a modification of the lighting circuit 22. The same reference numerals will be given to the same components as those of the lighting circuit 22, and a redundant description thereof will be omitted.

The lighting circuit 22a includes a minimum current generating circuit C2 instead of the minimum current generating circuit C1. The minimum current generating circuit C2 includes a diode 66 which is a reverse-biased diode connected in parallel with the switching transistor 57. The diode 66 is turned on when the switching transistor 57 is turned off, and has an impedance to flow the minimum current Imin. The diode 66 may be connected in series with other impedance elements such as a resistor for impedance adjustment and the like.

The lighting circuit 22a has the same configuration and operation as those of the lighting circuit 22 except for the minimum current generating circuit C2. In the light emitting element lighting circuit 22a, it is possible to obtain the result similar to that shown in FIG. 4A by the action (function) of the minimum current generating circuit C2. As described above, the minimum current generating circuit C2 has a simple structure since there is no need for processing of the PWM modulation signal during the OFF period and, thus, it is possible to reduce the manufacturing cost of the lighting circuit 22a.

Further, the dimming signal conversion unit 52 may output an off pulse signal having a duty ratio other than 0% as an off pulse signal having a duty ratio different from that of the PWM dimming signal generated in response to the dimming signal. For example, when PWM dimming signals having duty ratios of 5, 15, 25, . . . , 95 are assigned to levels 1 to 10, respectively, the off pulse signal may be set to have a duty ratio other than 0%, e.g., a duty ratio of 10% or 100%. In this case, in the turn-off signal generator 80, a timer which detects the off pulse signal based on the length of the ON period or OFF period is used as the timer 80a, or a circuit which detects the off pulse signal by pattern matching is used instead of the timer 80a. Further, if the PWM dimming signal is detected based on the length of the ON period or OFF period, or detected by pattern matching, a circuit generating a reset signal is used.

Second Embodiment

Figure 6:
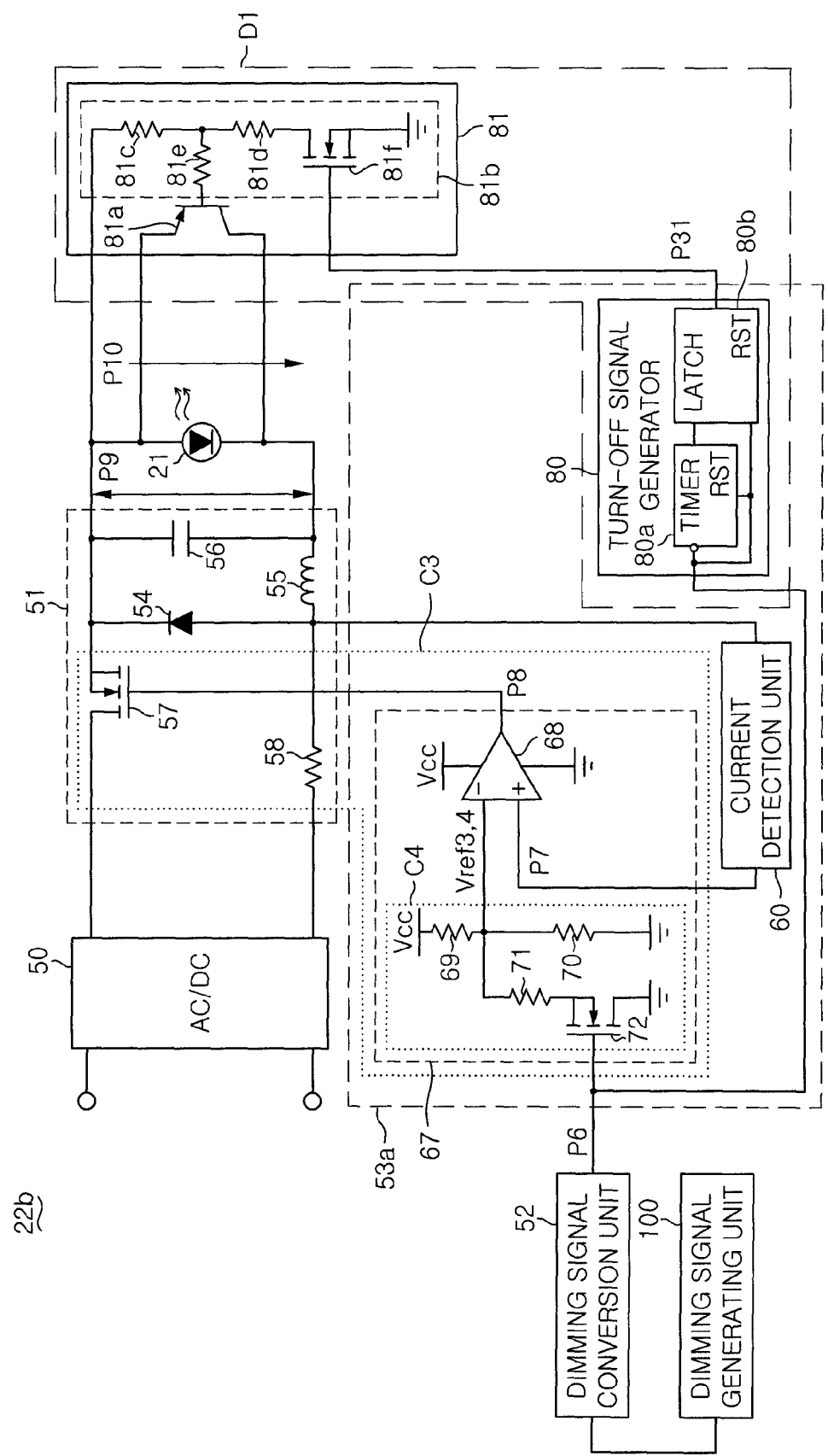
FIG. 6 is a circuit diagram of a lighting circuit for the light emitting element in accordance with a second embodiment of the present invention.

FIG. 6 is a circuit diagram of a light-emitting-element lighting circuit 22b included in an illumination apparatus in accordance with a second embodiment of the present invention. The lighting circuit 22b has the minimum current Imin to flow by reducing a pulse width of a chopper signal during the OFF period and achieves a rapid lighting of the light emitting element when it is switched to a next ON period. The illumination apparatus of the second embodiment has the same configuration as that of the illumination apparatus 1 (FIG. 1) except for the light emitting element lighting circuit 22b. In the lighting circuit 22b, the same reference numerals will be given to the same components as those of the light emitting element lighting circuit 22, and a redundant description thereof will be omitted.

The lighting circuit 22b includes the AC/DC unit 50 connected to the commercial AC power source, the power conversion unit 51, the dimming signal conversion unit 52 connected to the dimming signal generating unit 100, a PWM dimming signal processing unit 53a, a minimum current generating circuit C3, and the minimum current stopping circuit D1. The PWM dimming signal processing unit 53a includes a control unit 67 and the current detection unit 60 which outputs a signal corresponding to a current value flowing on the downstream side of the switching transistor 57. The control unit 67 reduces the cycle of the chopper signal outputted to the switching transistor 57 into 1 to several % during the OFF period to flow the minimum current Imin in the light emitting element 21. In other words, a circuit including the switching transistor 57 and the control unit 67 corresponds to the minimum current generating circuit C3 that generates the minimum current Imin.

The control unit 67 includes a comparator 68 and a circuit C4 which outputs a low reference signal Vref3 and a high reference signal Vref4. The circuit C4 outputs the low reference signal Vref3 during the ON period, and outputs the high reference signal Vref4 during the OFF period. In the circuit C4, one end of a resistor 69 is connected to a power source voltage Vcc, and the other end of the resistor 69 is connected to one ends of resistors 70 and 71. The other end of the resistor 70 is grounded. The other end of the resistor 71 is grounded via a switching transistor 72 which functions as an OFF period detection circuit. The PWM dimming signal from the dimming signal conversion unit 52 is applied to the gate of the switching transistor 72.

In the above configuration, during the ON period, the switching transistor 72 is turned on and, thus, the resistor 69, the resistor 70 and the resistor 71 serve as a first voltage divider. During the OFF period, the switching transistor 72 is turned off and, thus, the resistor 69 and the resistor 70 serve as a second voltage divider. The reference voltage Vref3 outputted from the first voltage divider has a value lower than the reference voltage Vref4 outputted from the second voltage divider.

The comparator 68 outputs a value obtained by quantizing a current value detected by the current detection unit 60 based on the reference value Vref3 during the ON period, and outputs a value obtained by quantizing a current value detected by the current detection unit 60 based on the reference value Vref4 during the OFF period. Consequently, in the comparator 68, a normal chopper signal is outputted during the ON period, and a chopper signal having a small pulse width is outputted during the OFF period in a short cycle compared to the normal chopper signal. The resistor 71 may have a high resistance value such that the minimum current Imin flows in the light emitting element 21. Further, other impedance elements may be used instead of the resistors 69, 70 and 71.

Figure 7:
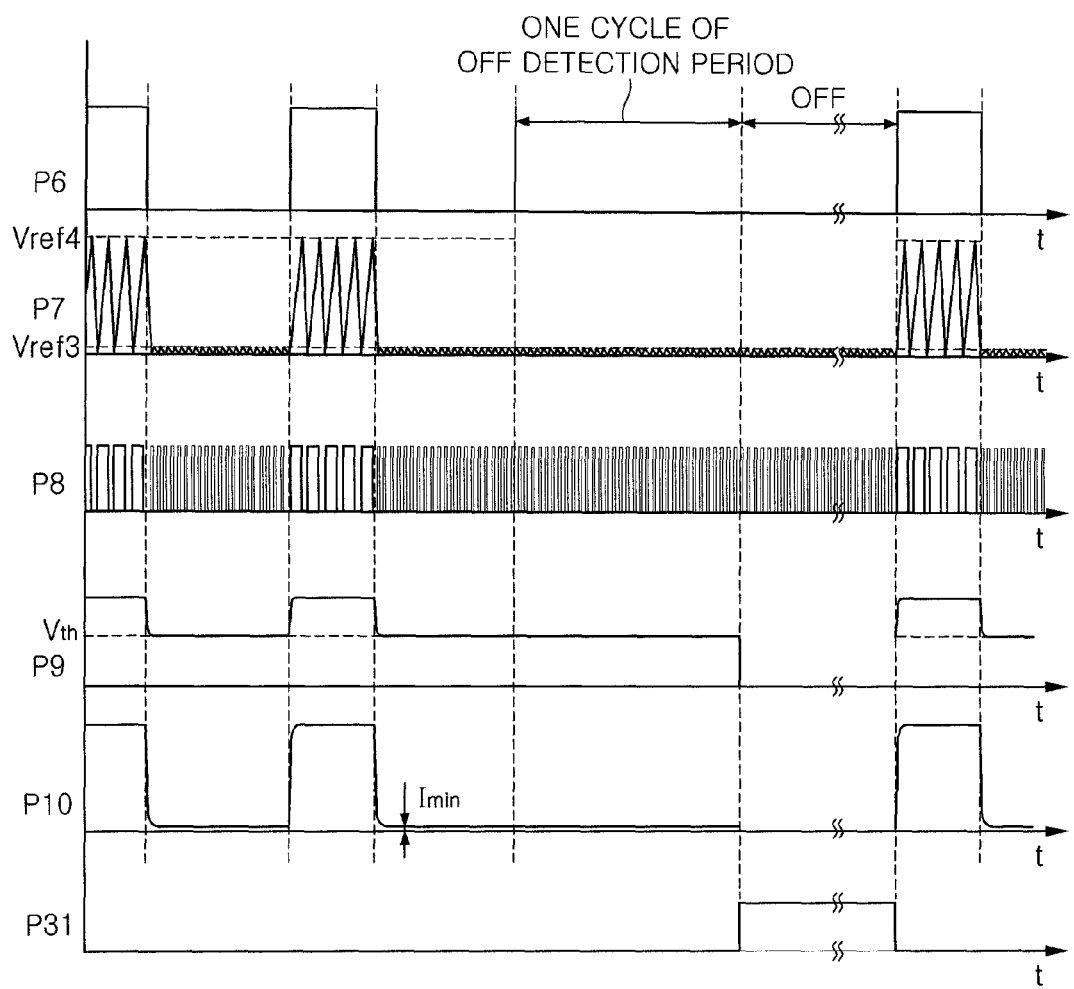
FIG. 7 is a time chart showing signals in the lighting circuit for the light emitting element of the second embodiment.

FIG. 7 shows waveforms of signals flowing through points P6 to P10 and P31 in the circuit shown in FIG. 6. A signal at point P6 indicates the PWM modulation signal outputted from the dimming signal conversion unit 52. For example, one cycle of the PWM modulation signal is set to be in a range from 0.5 to 10 ms (frequency f is in a range from 0.1 kHz to 2 kHz). A signal at point P7 is outputted from the current detection unit 60. For example, one cycle of the signal is set to be in a range from 1 to 10 μs (frequency f is in a range from 100 kHz to 1 MHz). A signal at point P8 is outputted from the control unit 67, which is obtained by quantizing the signal from point P7 based on the reference voltage Vref3 during the ON period, and based on the reference voltage Vref4 during the OFF period. As shown in FIG. 7, the chopper signal outputted during the OFF period has a short cycle and a small pulse width compared to the chopper signal outputted during the ON period. Point P9 indicates a value of a voltage applied to the light emitting element 21 and point P10 indicates a current value flowing in the light emitting element 21. Point P31 indicates an output signal of the turn-off signal generator 80.

As shown in FIG. 7, during the OFF period in the burst dimming, the minimum current Imin flows in the light emitting element 21, so that a voltage slightly greater than the threshold voltage Vth is applied to the light emitting element 21. In other words, it indicates that the light emitting element 21 slightly emits a light during this OFF period. Then, when it is switched to a next ON period, the current flowing in the light emitting element 21 is increased in proportion to the increase in the applied voltage without any delay.

Further, if the OFF period is continued for one cycle of the PWM dimming signal, the turn-off signal generator 80 outputs a turn-off signal of high level until the dimming signal is inputted. While the turn-off signal of high level is outputted, the minimum current stopping circuit D1 stops the current including the minimum current Imin from flowing in the light emitting element 21. Further, when the PWM dimming signal is switched to an ON period in order to resume the burst dimming, the minimum current stopping circuit D1 stops its operation, and the current immediately flows in the light emitting element 21 compared to a case where the supply of power has been completely turned off.

As can be seen from FIG. 7, the minimum current generating circuit C3 included in the lighting circuit 22*b* has the minimum current Imin to flow by reducing the pulse width of the chopper signal during the OFF period in the burst dimming to thereby achieve a rapid lighting of the light emitting element 21. Further, the minimum current stopping circuit D1 prevents an unnecessary current from flowing in the circuit when the light emitting element is turned off instead of the burst dimming.

Third Embodiment

Figure 8:
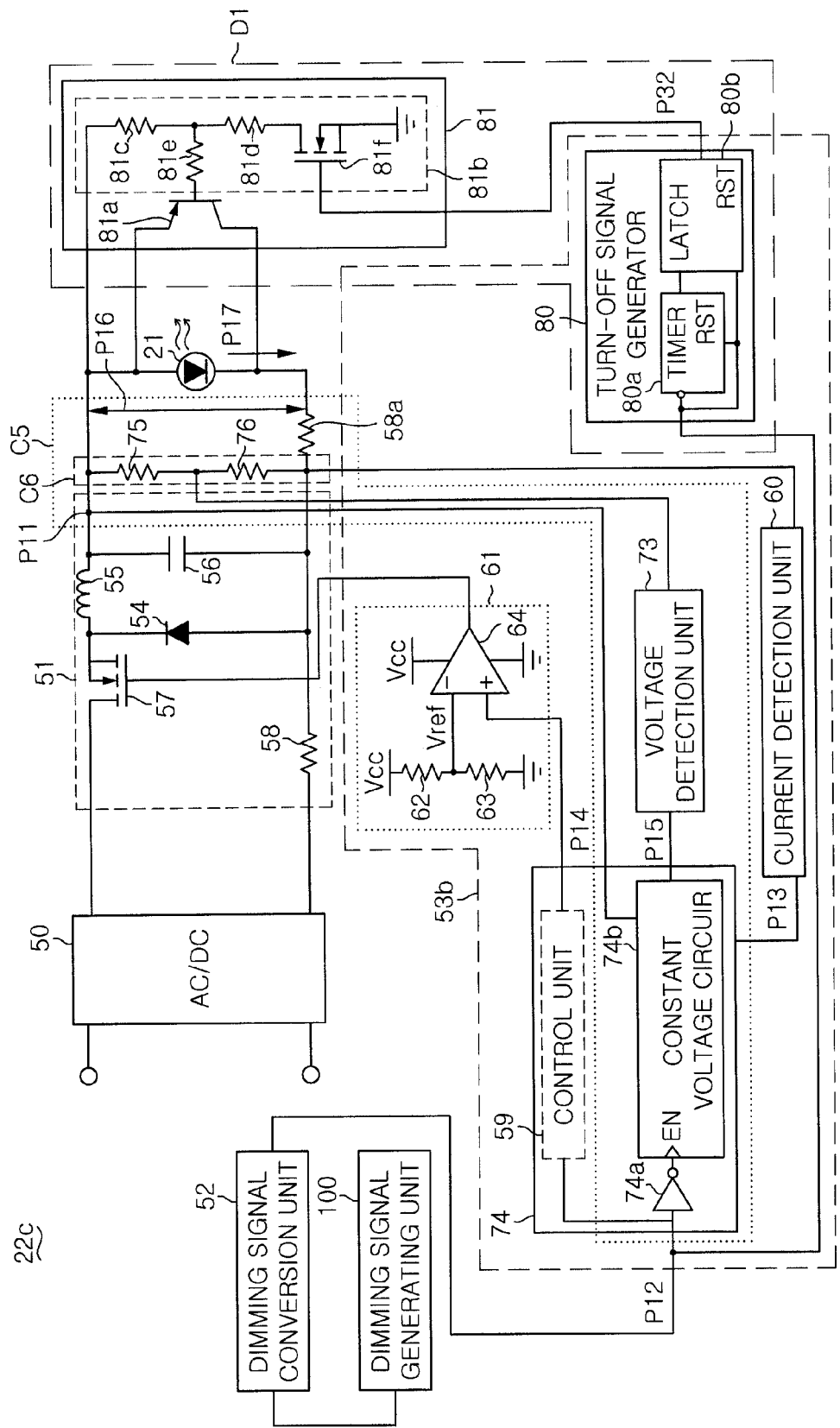
FIG. 8 is a circuit diagram of a lighting circuit for the light emitting element in accordance with a third embodiment of the present invention.

FIG. 8 is a circuit diagram of a light-emitting-element lighting circuit 22*c* included in an illumination apparatus in accordance with a third embodiment of the present invention. The illumination apparatus of the third embodiment has the same configuration as that of the illumination apparatus 1 (FIG. 1) except for the lighting circuit 22*c*. The lighting circuit 22*c* includes a constant voltage circuit which operates only during the OFF period, and has the minimum current Imin to flow in the light emitting element 21 to achieve rapid lighting of the light emitting element when it is switched to a next ON period. In the light emitting element lighting circuit 22*c*, the same reference numerals will be given to the same components as those of the light emitting element lighting circuit 22, and a redundant description thereof will be omitted.

The lighting circuit 22*c* includes the AC/DC unit 50 connected to the commercial AC power source, the power conversion unit 51, the dimming signal conversion unit 52 connected to the dimming signal generating unit 100, a PWM dimming signal processing unit 53*b*, a minimum current generating circuit C5, and the minimum current stopping circuit D1. A resistor 58*a* is provided at the front side of the power conversion unit 51 and an output end of the light emitting element 21, but its action (function) on the circuit is the same as the resistor 58 of the lighting circuit 22.

The PWM dimming signal processing unit 53*b* includes a control unit 74, the current detection unit 60 which outputs a signal corresponding to a current value flowing on the downstream side of the switching transistor 57, and a driving signal generator 61.

The control unit 74, in addition to the control unit 59 of the light emitting element lighting circuit 22 shown in FIG. 3, includes a constant voltage circuit 74*b*, which receives the PWM dimming signal through an inverter 74*a* and starts its operation in response to the input of an OFF period of the PWM dimming signal. The inverter 74*a* functions as an OFF period detection circuit.

A voltage detection unit 73 detects an output of a voltage divider C6 including resistors 75 and 76 connected in series between an input and an output terminal of the light emitting element 21.

The constant voltage circuit 74*b* uses an output of the voltage detection unit 73 as a feedback signal, and performs a constant voltage control so that a voltage applied to point P11 has a value greater than the threshold voltage Vth but equal to or less than a voltage Vref5 (see FIG. 9) at which a light is emitted at the lowest emission level. Thus, the minimum current Imin flows in the light emitting element 21 during the OFF period.

Figure 9:
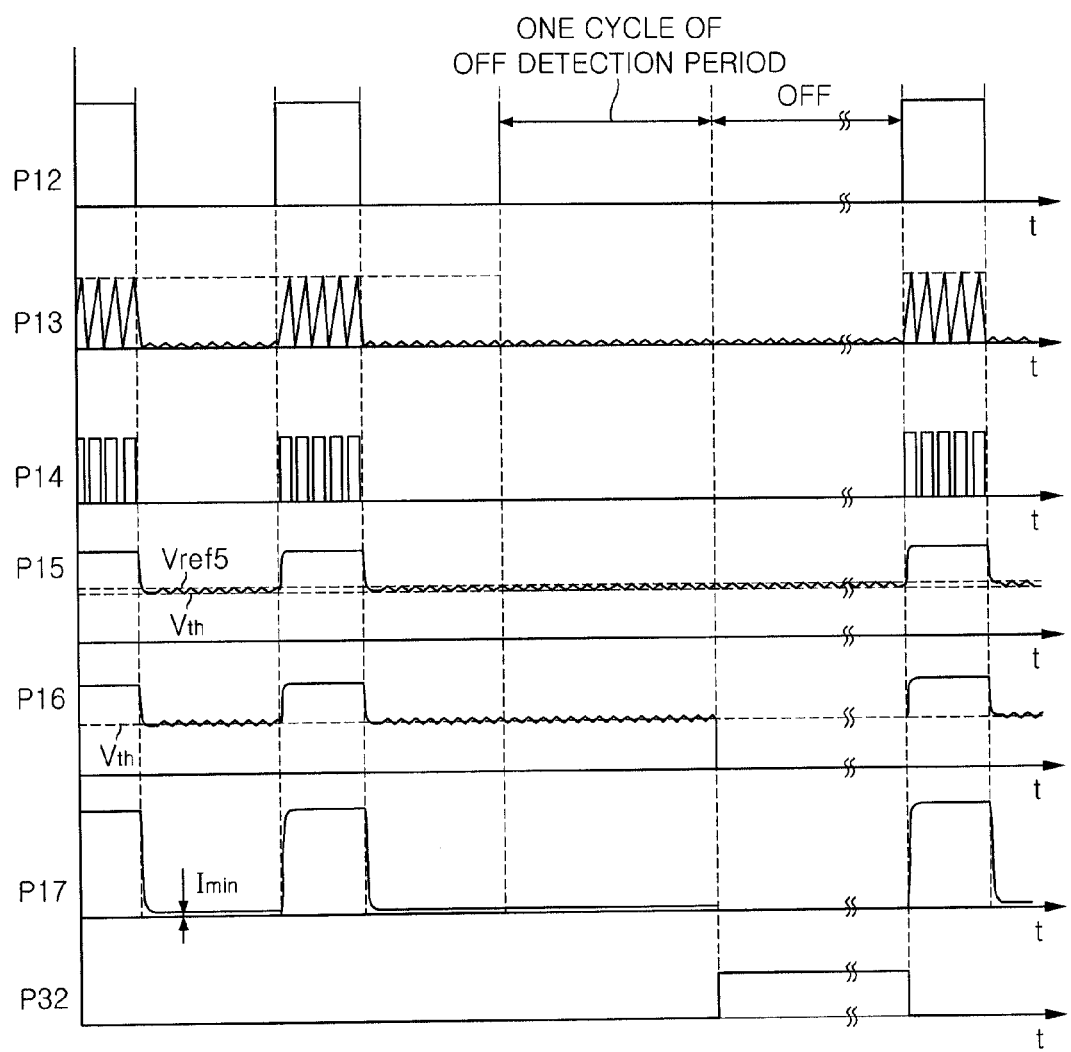
FIG. 9 is a time chart showing signals in the lighting circuit for the light emitting element of the third embodiment.

FIG. 9 shows waveforms of signals flowing through points P12 to P17 and P32 in the circuit shown in FIG. 8. A signal at point P12 indicates the PWM modulation signal outputted from the dimming signal conversion unit 52. For example, one cycle of the PWM modulation signal is set to be in a range from 0.5 to 10 ms (frequency f is in a range from 0.1 kHz to 2 kHz). A signal at point P13 is outputted from the current detection unit 60. For example, one cycle of the signal is set to be in a range from 1 to 10 μs (frequency f is in a range from 100 kHz to 1 MHz). A signal at point P14 is outputted from the control unit 74, which is obtained by quantizing the signal of point P13 based on the reference voltage Vref1 (see FIG. 3) during the ON period. A signal at point P15 is outputted from the voltage detection unit 73, wherein, during the OFF period, the voltage applied to the light emitting element 21 has a value greater than the threshold voltage Vth but equal to or less than the reference voltage Vref5 by the action (function) of the constant voltage circuit 74b of the control unit 74. Point P16 indicates a value of the voltage applied to the light emitting element 21 and point P17 indicates a current value flowing in the light emitting element 21. Point P32 indicates an output signal of the turn-off signal generator 80.

As shown in FIG. 9, during the OFF period in the burst dimming, the minimum current Imin flows in the light emitting element 21, so that a voltage which exceeds the threshold voltage Vth, but equal to or less than the reference voltage Vref5, is applied to the light emitting element 21. In other words, it indicates that the light emitting element 21 slightly emits a light during this OFF period. Then, when it is switched to a next ON period, the current flowing in the light emitting element 21 is increased in proportion to the increase in the applied voltage without any delay.

Further, if the OFF period is continued for one cycle of the PWM dimming signal, the turn-off signal generator 80 outputs a turn-off signal of high level until the dimming signal is inputted. While the turn-off signal of high level is outputted, the minimum current stopping circuit D1 stops the current including the minimum current Imin from flowing in the light emitting element 21. Further, when the PWM dimming signal is switched to an ON period in order to resume the burst dimming, the minimum current stopping circuit D1 stops its operation, and the current immediately flows in the light emitting element 21 compared to a case where the supply of power has been completely turned off.

As can be seen from FIG. 9, the minimum current generating circuit C5 included in the lighting circuit 22c has the minimum current Imin to flow by operating the constant voltage circuit 74b during the OFF period in the burst dimming to thereby achieve a rapid lighting of the light emitting element 21. Further, the minimum current stopping circuit D1 prevents an unnecessary current from flowing in the circuit when the light emitting element is turned off instead of the burst dimming.

Fourth Embodiment

Figure 10:
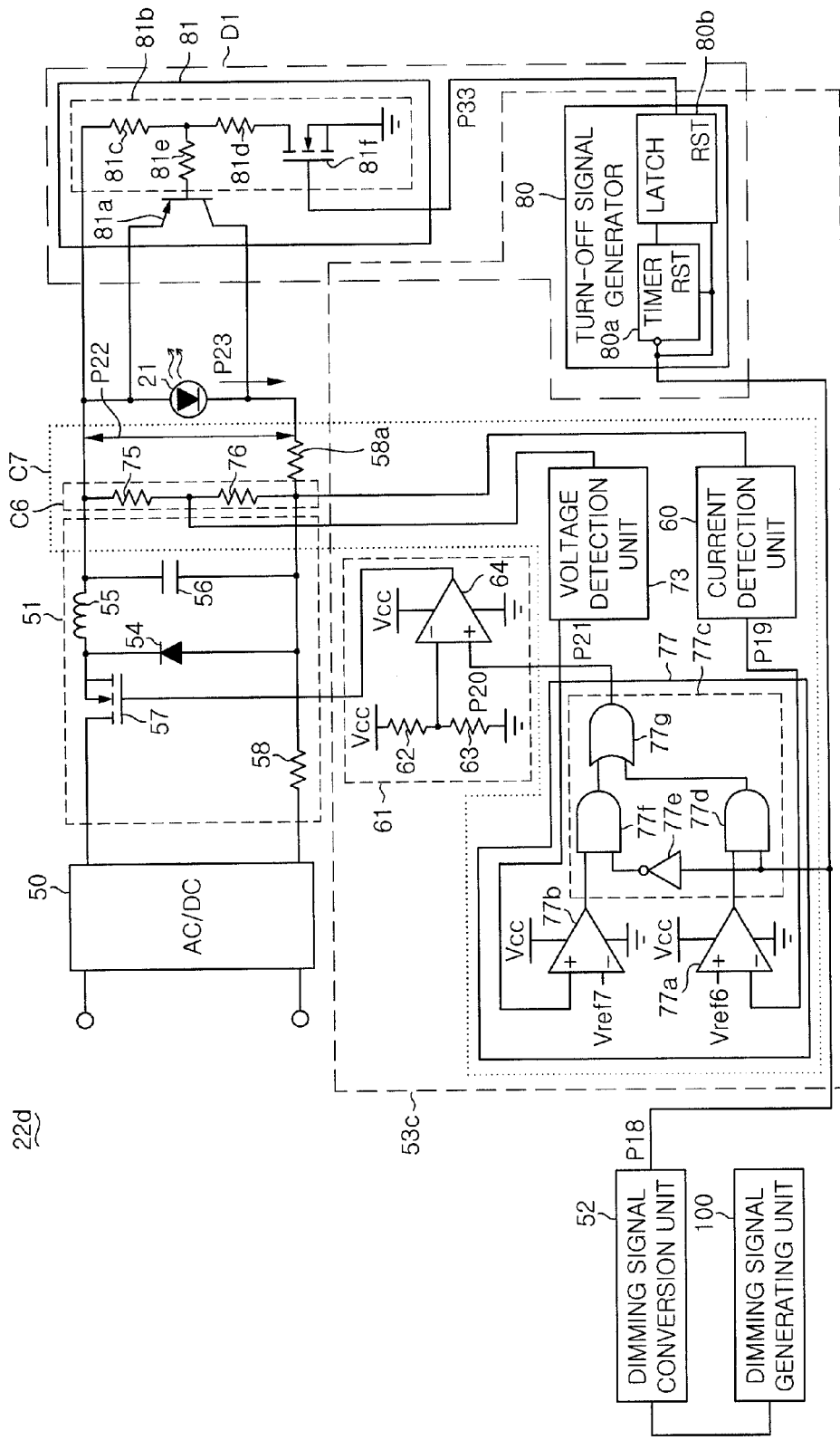
FIG. 10 is a circuit diagram of a lighting circuit for the light emitting element in accordance with a fourth embodiment of the present invention.

FIG. 10 is a circuit diagram of a light-emitting-element lighting circuit 22d included in an illumination apparatus in accordance with a fourth embodiment of the present invention. The illumination apparatus of the fourth embodiment has the same configuration as that of the illumination apparatus 1 (FIG. 1) except for the lighting circuit 22d. The lighting circuit 22d includes a circuit for controlling to flow the minimum current Imin in the light emitting element 21 based on a voltage applied to the light emitting element 21 during the OFF period, and achieves a rapid lighting of the light emitting element 21 when it is switched to a next ON period. In the light emitting element lighting circuit 22d, the same reference numerals will be given to the same components as those of the light emitting element lighting circuits 22 and 22c, and a redundant description thereof will be omitted.

The lighting circuit 22d includes the AC/DC unit 50 connected to the commercial AC power source, the power conversion unit 51, the dimming signal conversion unit 52 connected to the dimming signal generating unit 100, a PWM dimming signal processing unit 53c, a minimum current generating circuit C7, and the minimum current stopping circuit D1.

The lighting circuit 22d further includes a control unit 77, the current detection unit 60 which outputs a signal corresponding to a current value flowing on the downstream side of the switching transistor 57, and the driving signal generator 61.

The control unit 77, during the ON period, quantizes an output of the current detection unit 60 based on a reference value Vref6, and outputs a signal after quantization (hereinafter referred to as a first signal) to the driving signal generator 61. Further, the control unit 77, during the OFF period, quantizes an output of the voltage detection unit 73 based on a reference voltage Vref7, and outputs a signal after quantization (hereinafter referred to as a second signal) to the driving signal generator 61. The reference voltage Vref7 is set to a value allowing the second signal to generate the driving signal such that a voltage, which is greater than the threshold voltage Vth to flow the minimum current Imin in the light emitting element 21, but equal to or less than the reference voltage Vref5 (see FIG. 9), is applied to the light emitting element 21.

Specifically, the control unit 77 includes a comparator 77a which generates the first signal, a comparator 77b which generates the second signal, and a logic gate 77c which outputs the first signal during the ON period and outputs the second signal during the OFF period. The logic gate 77c includes an AND gate 77d to which the PWM dimming signal and the first signal are inputted, an inverter 77e which inverts the PWM dimming signal, an AND gate 77f to which the inverted PWM dimming signal and the second signal are inputted, and an OR gate 77g. The OR gate 77g has input terminals to which output signals of the AND gates 77d and 77f are inputted, and the OR gate 77g has an output terminal connected to the driving signal generator 61. The AND gates 77d and 77f and the inverter 77e function as an OFF period detection circuit.

Figure 11:
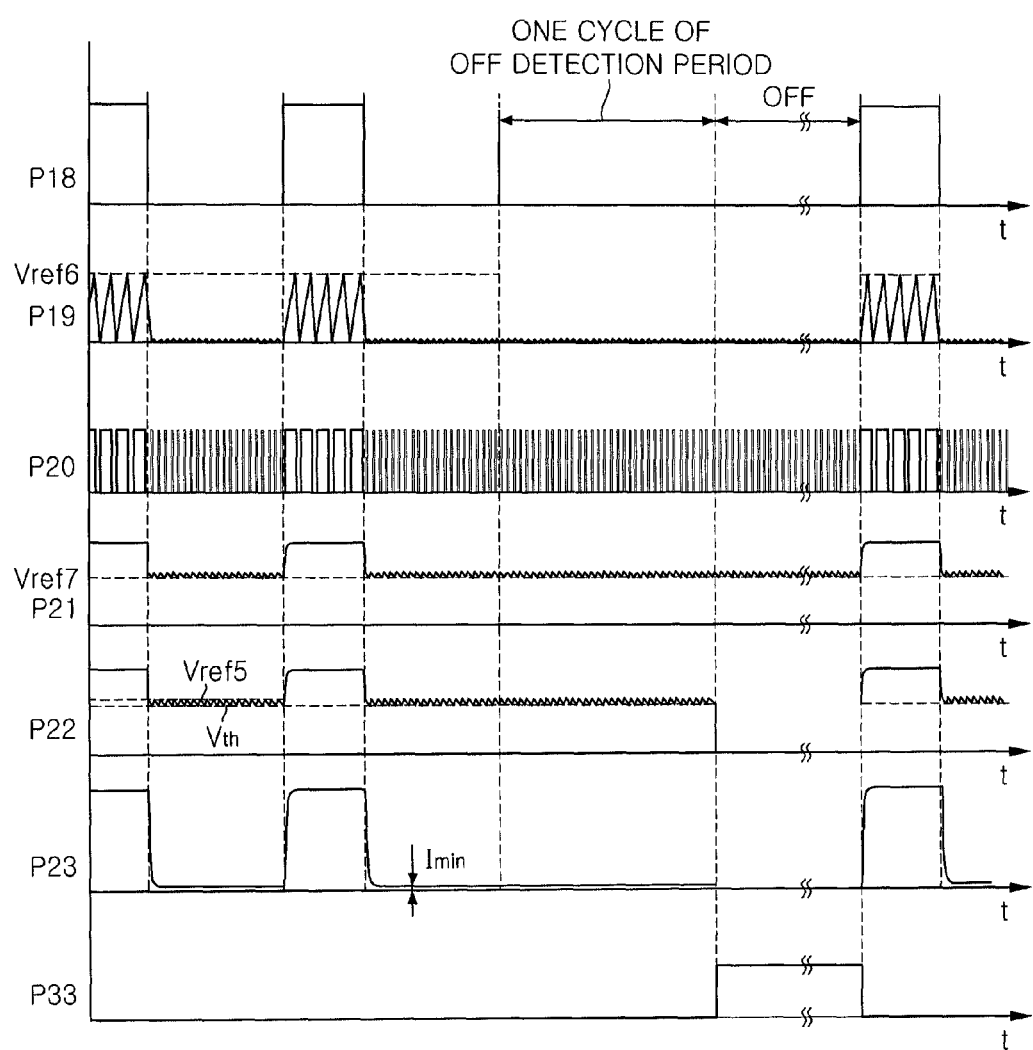
FIG. 11 is a time chart showing signals in the lighting circuit for the light emitting element of the fourth embodiment.

FIG. 11 shows waveforms of signals flowing through points P18 to P23 and P33 in the circuit shown in FIG. 10.

A signal at point P18 is a PWM modulation signal outputted from the dimming signal conversion unit 52. For example, one cycle of the PWM modulation signal is set to be in a range from 0.5 to 10 ms (frequency f is in a range from 0.1 kHz to 2 kHz). A signal at point P19 is outputted from the current detection unit 60. For example, one cycle of the signal is set to be in a range from 1 to 10 μs (frequency f is in a range from 100 kHz to 1 MHz). A signal at point P20 is outputted from the control unit 77, which is obtained by quantizing the signal from point P19 based on the reference voltage Vref6 during the ON period. A signal at point P21 is outputted from the voltage detection unit 73, wherein, during the OFF period, the voltage applied to the light emitting element 21 has a value greater than the threshold voltage Vth but equal to or less than the reference voltage Vref5 (see FIG. 9). Point P22 indicates a value of the voltage applied to the light emitting element 21 and point P23 indicates a current value flowing in the light emitting element 21. Point P33 indicates an output signal of the turn-off signal generator 80.

As shown in FIG. 11, during the OFF period in the burst dimming, the minimum current Imin flows in the light emitting element 21, so that a voltage which exceeds the threshold voltage Vth, but equal to or less than the reference voltage Vref5 is applied to the light emitting element 21. In other words, it indicates that the light emitting element 21 slightly emits a light during this OFF period. Then, when it is switched to a next ON period, the current flowing in the light emitting element 21 is increased in proportion to the increase in the applied voltage without any delay.

Further, if the OFF period is continued for one cycle of the PWM dimming signal, the turn-off signal generator 80 outputs an off signal of high level until the dimming signal is inputted. While the turn-off signal of high level is outputted, the minimum current stopping circuit D1 stops the current including the minimum current Imin from flowing in the light emitting element 21. Further, when the PWM dimming signal is switched to an ON period in order to resume the burst dimming, the minimum current stopping circuit D1 stops its operation, and the current immediately flows in the light emitting element 21 compared to a case where the supply of power has been completely turned off.

Further, in the above-described embodiments, the lighting circuit includes the minimum current stopping circuit D1, which generates the turn-off signal if the signal for turn-off is inputted instead of the dimming signal from the dimming signal generating unit 100, and stops the current including the minimum current from flowing in the light emitting element 21 if the OFF period is continued for one cycle of the PWM dimming signal. However, the present invention is not limited to the above-described embodiments.

For example, a configuration in which the minimum current stopping circuit D1 is not provided may be applied to the present invention. In this case, even if the OFF period is continued for one cycle of the PWM dimming signal, the minimum current Imin is allowed to continuously flow without stopping the current from flowing in the light emitting element 21.

In addition, the present invention is not limited to the configurations of the above-described embodiments and may be variously modified without changing the spirit of the invention. For example, instead of the AC/DC unit which converts the AC voltage from the commercial AC power supply into the DC voltage, a DC voltage source such as a battery may be used.

Other Embodiments

As shown in FIG. 2B, the current flowing through the light emitting element having a diode characteristic flows slightly until it exceeds the threshold voltage Vth, and stepwisely increases after exceeding the threshold voltage Vth. Focusing on this characteristic of the light emitting element, the minimum current generating circuit may include a unit to increase the minimum current Imin until it reaches a current value at which the light emitting element 21 reliably emits light and maintains the increased state. Specifically, the minimum current generating circuit includes an ammeter of the light emitting element 21, a comparator which compares a measured current value with a current I0, and a regulation unit which increases the minimum current Imin until the measured current value exceeds the current I0 and maintains the increased state. By employing such configuration, simultaneous emission of all light emitting elements of an illumination apparatus using multiple light emitting elements can be realized.

The lighting circuit for the light emitting element of the present invention may be used as a general lighting circuit of a light emitting element having a diode characteristic without being limited to the organic EL light emitting element. A light emitting panel including a light emitting element and a lighting circuit may be used in an illumination apparatus.

While the invention has been shown and described with respect to the embodiments, it will be understood by those skilled in the art that various changes and modification may be made without departing from the scope of the invention as defined in the following claims.

What is claimed is:

1. A light-emitting-element lighting circuit for dimming a light emitting element having a diode characteristic by a PWM dimming signal, the lighting circuit comprising:
a dimming signal conversion unit configured to generate the PWM dimming signal having a duty ratio corresponding to an emission level specified by an input dimming signal; and
a minimum current generating circuit configured to flow a minimum current during an OFF period of the PWM dimming signal generated by the dimming signal conversion unit such that a voltage greater than a threshold voltage designed to allow the light emitting element to emit a light is applied to the light emitting element, and the light emitting element emits a light of a brightness equal to or less than a lowest emission level specified by the dimming signal.

2. The lighting circuit of claim 1, further comprising:
a dimming signal generating unit configured to generate a dimming signal and a signal for turn-off; and
a minimum current stopping circuit configured to stop a flow of the minimum current,
wherein the dimming signal conversion unit generates, when the dimming signal has been inputted, the PWM dimming signal having a duty ratio greater than 0% depending on the emission level specified by the dimming signal, or generates, when the signal for turn-off has been inputted, an off pulse signal having a duty ratio different from that of the PWM dimming signal generated in response to the dimming signal, and the dimming signal conversion unit outputs the generated PWM dimming signal or the generated off pulse signal, and
wherein the minimum current stopping circuit stops the flow of the minimum current by short-circuiting between an input and an output terminal of the light emitting element when the off pulse signal is inputted.

3. The lighting circuit of claim 2, wherein the minimum current stopping circuit includes a turn-off signal generator configured to generate the signal for turn-off based on an input of the off pulse signal, and a transistor switch which is connected to the input and the output terminal of the light emitting element to configure a closed circuit, the transistor switch being configured to short-circuit between the input and the output terminal of the light emitting element in response to an input of the signal for turn-off.

4. The lighting circuit of claim 3, wherein the turn-off signal generator detects the off pulse signal based on a length of the OFF period when the PWM dimming signal and the off pulse signal are inputted, and includes a timer configured to output a detection signal and a latch configured to operate in response to an input of the detection signal to output the signal for turn-off, and
wherein the timer and the latch have reset terminals to which the PWM dimming signal and the off pulse signal are inputted to perform a reset operation in response to an input of the PWM dimming signal.

5. The lighting circuit of claim 2, further comprising:
a DC voltage generation circuit which has a driving unit to turn on and off a supply of power to the light emitting element and is connected to the light emitting element through the driving unit to output a DC voltage to the light emitting element while the driving unit is driven; and
a PWM dimming signal processing unit configured to turn off the driving unit during the OFF period of the PWM dimming signal and output a driving signal to drive the driving unit during an ON period of the PWM dimming signal.

6. The lighting circuit of claim 5, wherein the DC voltage generation circuit includes a chopper circuit, and outputs the DC voltage to the light emitting element through the chopper circuit, wherein the driving unit is a switching transistor to chop a current in the chopper circuit by a chopper signal, and turns off the supply of power to the light emitting element when the chopper signal is not inputted, and wherein the PWM dimming signal processing unit outputs as the driving signal, the chopper signal to the switching transistor during the ON period of the PWM dimming signal.

7. The lighting circuit of claim 2, wherein the minimum current generating circuit is an impedance element, one end of which is connected to the output terminal of the light emitting element and the other end of which is grounded.

8. The lighting circuit of claim 2, wherein the light emitting element is an organic electroluminescence (EL) light emitting element.

9. An illumination apparatus comprising:
one or more illumination panels each having a light emitting element, and
wherein the light emitting element is provided with the lighting circuit described in claim 2.

10. The lighting circuit of claim 1, further comprising:
a DC voltage generation circuit which has a driving unit to turn on and off a supply of power to the light emitting element and is connected to the light emitting element through the driving unit to output a DC voltage to the light emitting element while the driving unit is driven; and
a PWM dimming signal processing unit configured to turn off the driving unit during the OFF period of the PWM dimming signal and output a driving signal to drive the driving unit during an ON period of the PWM dimming signal.

11. The lighting circuit of claim 10, wherein the DC voltage generation circuit includes a chopper circuit, and outputs the DC voltage to the light emitting element through the chopper circuit, wherein the driving unit is a switching transistor to chop a current in the chopper circuit by a chopper signal, and turns off the supply of power to the light emitting element when the chopper signal is not inputted, and wherein the PWM dimming signal processing unit outputs as the driving signal, the chopper signal to the switching transistor during the ON period of the PWM dimming signal.

12. The lighting circuit of claim 10, wherein the minimum current generating circuit includes a diode which is a reverse-biased diode connected in parallel with the driving unit of the DC voltage generation circuit, and the diode is turned on when the driving unit is turned off and has an impedance to flow the minimum current.

13. The lighting circuit of claim 10, wherein the PWM dimming signal processing unit includes a detection circuit to detect the OFF period, and wherein the minimum current generating circuit converts the driving signal into a different driving signal having a duty ratio to flow the minimum current and outputs the different driving signal to the driving unit in response to the detection of the OFF period by the detection circuit.

14. The lighting circuit of claim 10, wherein the PWM dimming signal processing unit includes a detection circuit to detect the OFF period, and wherein the minimum current generating circuit includes a constant voltage circuit which starts an operation in response to the detection of the OFF period by the detection circuit, and applies a voltage to the light emitting element such that the voltage applied to the light emitting element is greater than the threshold voltage and the light emitting element emits a light of the brightness equal to or less than the lowest emission level specified by the dimming signal.

15. The lighting circuit of claim 1, wherein the minimum current generating circuit is an impedance element, one end of which is connected to the output terminal of the light emitting element and the other end of which is grounded.

16. The lighting circuit of claim 15, wherein the impedance element is a resistor.

17. The lighting circuit of claim 15, wherein the impedance element is a diode.

18. The lighting circuit of claim 15, wherein the impedance element is a switching transistor in an OFF state.

19. The lighting circuit of claim 1, wherein the light emitting element is an organic electroluminescence (EL) light emitting element.

20. An illumination apparatus comprising:
one or more illumination panels each having a light emitting element, and
wherein the light emitting element is provided with the lighting circuit described in claim 1.

* * * * *